United States Patent Office 2,895,992
Patented July 21, 1959

2,895,992
PROCESS FOR THE PRODUCTION OF BENZOIC ACID DERIVATIVES

Gerhard Ohnacker and August Kottler, Biberach (Riss), Germany, assignors to Dr. Karl Thomae G.m.b.H., Biberach (Riss), Germany, a corporation of Germany No Drawing. Application June 28, 1955
Serial No. 518,684

Claims priority, application Germany June 29, 1954

6 Claims. (Cl. 260—559)

The present invention relates to a process for the production of benzoic acid derivatives, and more particularly to the production of benzoic acid derivatives having the general structural formula (I)

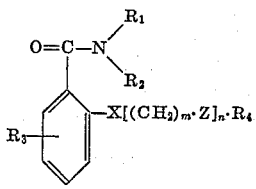

wherein $R_1$ represents hydrogen, an alkyl radical with 1 to 5 carbon atoms or an oxyalkyl radical with 1 to 4 carbon atoms, $R_2$ represents hydrogen, an alkyl radical with 1 to 5 carbon atoms or an aminoalkyl radical with 1 to 4 carbon atoms, $R_3$ represents a hydrogen or a halogen atom, $R_4$ represents a straight-chain or branched-chain alkyl radical with 1 to 4 carbon atoms or a carbomethylene group, X and Z represent sulfur or oxygen, and $m$ and $n$ represent integers from 1 to 3, inclusive. $R_1$ and $R_2$ may also form a heterocyclic ring system together with the nitrogen atom; the heterocyclic ring system may include other hetero atoms. Thus, for example, the heterocyclic ring of which $R_1$ and $R_2$ may be a part, can be a pyridine ring, a piperidine ring or a morpholine ring. In the event $R_3$ is a halogen atom, it may be attached to the benzene nucleus in the 3-, 4-, 5- or 6- position, but the 5-position is preferred. X and Z may both be sulfur or oxygen atoms, but one may also be oxygen and the other sulfur. Similarly, $m$ and $n$ may represent the same integer, but may also represent different integers.

The compounds according to the present invention are obtained by reacting a compound having the general structural formula

II)

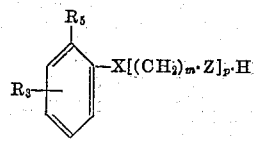

with a compound having the general structural formula (III)      $Y[(CH_2)_m \cdot Z]_q \cdot H$ In the above Formulas II and III, $R_3$, $R_4$, Z, X and $m$ have the above-identified meanings, $R_5$ represents either a

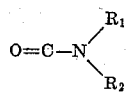

group (wherein $R_1$ and $R_2$ represent radicals as above indicated) or a substituent radical capable of being transformed into such a group, for example an ester group, such as —COOalkyl, or the nitrole group —CN, Y represents a reactive radical, such as a halogen atom or a p-toluene-sulfonyl radical, and $p$ and $q$ represent integers from 0 to 3, inclusive. However, $p$ and $q$ may not simultaneously be zero, and their sum, i.e. $p+q$, must be equal to or less than 3.

The etherification, i.e. the reaction between the compound having the structural Formula II and the compound having the structural formula III, may be carried out according to methods known per se. For example, the etherification may be accomplished by reacting alkali metal salts of a compound having the general structural Formula II with a compound having the general Formula III. The reaction can be carried out in the absence of solvents, in aqueous suspension, or in the presence of inert solvents, such as alcohols or toluene. It is advantageous to react the above compounds at elevated temperatures, for example at temperatures between 60° C. and 150° C., preferably at the boiling point of the reaction mixture. If desired, it may also be carried out in the presence of a reaction accelerator, such as potassium iodide.

If one of the reactants is a compound of the general Formula II wherein $R_5$ represents a substituent capable of being transformed into a —$CO.NR_1R_2$-group, the transformation of $R_5$ into the —$CO.NR_1R_2$-group takes place after the etherification reaction between Compounds II and III. This transformation can be accomplished in accordance with well known methods. For example, if $R_5$ is an ester group, it may be transformed directly into the —$CO.NR_1R_2$ group by amidation. The ester group may, however, also be saponified into an acid group, and the acid-ethers thus formed may then be transformed into the compounds according to Formula I by dehydration of their amino-salts, or the acid-ethers may first be transformed into acid halide-ethers by known methods, for example with thionyl-halides, and then reacted with amines to form the compounds having the general Formula I. If $R_5$ is a nitrile group, the nitrile-ethers obtained by the reaction can be transformed into the compounds having the general Formula I by saponification.

The amidation of the ester-ethers can be carried out in the absence as well as in the presence of solvents, such as toluene, for example, or also in aqueous suspension. The amidation is carried out at elevated temperatures, preferably at a temperature between 80 and 150° C. If desired, the reaction may be performed in a closed tube.

As pointed out above, the ester-ethers may also be saponified at the ester group in accordance with known methods, and the acid-ethers thus obtained can be transformed in the compounds of Formula I by dehydration of their salts with secondary amines having the general formula $HN.R_1R_2$ wherein $R_1$ and $R_2$ represent the radicals above indicated. The dehydrogenation of the amino-salts is carried out, for example, by heating a mixture of the acid-ether and an amine having the general formula $HN.R_1R_2$, wherein one of the components is present in excess, or by heating the previously isolated amino-salts of the acid-ethers. For this purpose temperatures between about 100° C. and 200° C. are used. If desired, the conversion of the ester-ethers may be carried out in the presence of a solvent, such as glacial acetic acid.

The ester-ethers may also be transformed into acid-ethers by saponification of the ester group, as indicated above, and thereafter be transformed into acid halide-ethers according to well-known methods, for example with thionyl-halides. The acid halide-ethers can then be reacted with amines having the formula $HN.R_1R_2$ to form the componds of the general Formula I. The reaction of the acid halide-ethers with the amines is preferably carried out in the presence of inert solvents, such as in ether, chloroform, benzene, toluene and so forth. The reaction will take place at low temperatures or at elevated temperatures, but preferably at the boiling point of the respective solvent.

The nitrile-ethers can be transformed into compounds of the general Formula I by saponification, which yields compounds of general Formula I wherein $R_1$ and $R_2$ are hydrogen atoms. This may, for example, be done by partial hydrolysis in the presence of strong mineral acids.

Furthermore compounds having the general formula

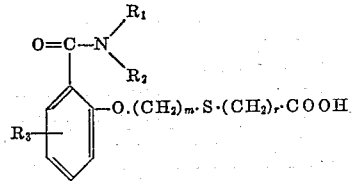

wherein $R_1$, $R_2$, $R_3$ and $m$ have the above-identified meanings, $r$ represents an integer from 1 to 3 inclusive and $m$ and $r$ may represent the same integer, but may also represent different integers, may alternatively be prepared by reacting a compound having the formula

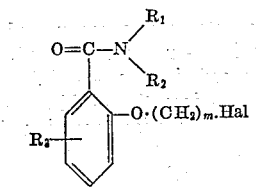

wherein $R_1$, $R_2$, $R_3$ and $m$ have the above-identified meanings and Hal represents a halogen atom with a compound having the formula $$Me.S.(CH_2)_r.COOH$$

wherein $r$ has the above-identified meaning and Me stands for an alkali metal atom, preferably for a natrium atom in the presence of a suitable solvent, e.g. ethanol, in known per se manner The compounds produced in accordance with the present invention are novel compounds which have valuable therapeutic properties. For example, they are far superior to salicylamide with respect to their antipyretic, antiphlogistic and analgetic effect. It was further surprisingly found that the compounds according to the present invention are free from sedative side-effects, in contrast to the hitherto known salicylamide ethers, such as those described, for example, by Bavin and associates [J. pharm. pharmacol. 4, 872 (1952)], E. Leong Way and associates, [J. pharm. Exp. Therap. 108, 450 (1953)] and in U.S. Patent 2,694,088.

The following examples will further illustrate the present invention and enable others skilled in the art to understand it more completely, without any intention, however, of limiting the invention to these examples.

*Example I*

16.5 gm. salicylamide were dissolved in 150 cc. of absolute alcohol to which 2.8 gm. sodium had previously been added. The solution was heated to boiling on a water bath and admixed with 21.7 gm. of of 2-butoxy-ethylbromide while stirring for 30 minutes. Subsequently, the mixture was heated to boiling for six hours. The alcohol was then distilled off in a vacuum, and the residue was admixed with water. The aqueous solution was then extracted with ether, and the ether extract was dried and evaporated. The residue was recrystallized from a mixture of ethyl acetate and petroleum ether. It was analyzed to be the 2-butoxyethyl ether of salicylamide and had a melting point of 65° C. The yield was 72% of the theoretical yield.

*Example II*

A mixture of 13.7 gm. salicylamide, 5.6 gm. potassium hydroxide, 25.8 gm. of the p-toluenesulfonyl ester of ethylene glycol mono-propyl ether and 100 cc. alcohol was heated for 6 hours on a boiling water bath. After driving off the alcohol, the residue was dissolved in ether and washed several times with water. The ether was then evaporated and the residue was recrystallized from dilute alcohol. The crystalline product was found to be the 2-propyloxyethyl ether of salicylamide, having a melting point of 62° C. The yield was 85% of the theoretical yield.

*Example III*

76 gm. methylsalicylate were dissolved in 450 cc. absolute alcohol, to which 11.5 gm. sodium had previously been added, and 76.5 gm. 2-ethoxyethyl bromide were added to the solution over a period of 1 hour while maintaining said solution at the boiling point. After 14 hours of additional boiling with reflux, the resulting reaction mass was worked up as described in Example I. 80 gm. of the 2-ethoxyethyl ether of salicylic acid methyl ester, having a boiling point of 124–126° C. at 0.3 mm. mercury, were obtained in this manner.

50 gm. of this ester were heated for 4 hours on an oil bath at 120° C. while passing a stream of ammonia therethrough and agitating the mass. The 2-ethoxyethyl ether of salicylamide formed thereby solidified upon cooling and was then recrystallized from dilute isopropanol. The recrystallized product had a melting point of 78° C. and the yield was 95% of the theoretical yield.

*Example IV*

By reacting equimolar amounts of methylsalicylate, sodium and 2-[(2'-ethoxy)-ethoxy]-ethylbromide in the manner described in Example III, the 2-[(2'-ethoxy)-ethoxy]-ethyl ether of salicylic acid methyl ester was obtained. The product had a boiling point of 146° C. at 0.06 mm. mercury and the yield was 60% of the theoretical yield.

50 gm. of this product were dissolved in 100 cc. toluene and then heated at the boiling point for 8 hours while passing a stream of ammonia therethrough. After separating the toluene and recrystallizing the residue from acetone, 40 gm. of the 2-[(2'-ethoxy)-ethoxy]-ethyl ether of salicylamide were obtained which had a melting point of 57° C.

*Example V*

By reacting equimolar amounts of methyl salicylate, sodium and 2-[(2'-butoxy)-ethoxy]-ethyl bromide in accordance with Example III, the 2-[(2'-butoxy)-ethoxy]-ethyl ether of salicylic acid methyl ester was formed. The boiling point of this product was 140° C. at 0.09 mm. mercury. The yield was 70% of the theoretical yield.

50 gm. of this compound were heated at 120° C. for 6 hours in the presence of 100 cc. 33% aqueous ammonia solution in a shaker autoclave. The resulting product was neutralized, dissolved in ether, dried, and the ether was evaporated. 39 gm. of the 2-[(2'-butoxy)-ethoxy]-ethyl ether of salicylamide were obtained. The product was recrystallized from acetone and then had a melting point of 62° C.

*Example VI*

22.4 gm. of the 2-ethoxyethyl ether of salicylic acid methyl ester described in Example III were heated for 6 hours on a water bath in the presence of 100 cc. of a 20% aqueous sodium hydroxide solution. After refining the resulting product in the usual manner, 15 gm. of the 2-ethoxyethyl ether of salicylic acid were obtained in the form of a highly viscous oil. This viscous product was transformed into the corresponding acid chloride by heating it on a water bath without further purification with thionyl chloride in benzene solution. The resulting product was diluted with 50 cc. of boiling benzene and then admixed with twice the molar amount of diethyl amine, and thereafter boiled with reflux for about 2 hours. 10 gm. of the 2-ethoxyethyl ether of salicylic acid diethyl amide, having a boiling point of 136° C. at 0.06 mm. mercury, were obtained in this manner.

Example VII

A mixture of 11.7 gm. thiosalicylic acid amide, 1.76 gm. sodium and 13 gm. 2-propyloxyethyl bromide was reacted in the manner described in Example I. 13.5 gm. of the 2-propyloxyethyl ether of thiosalicylic acid amide were obtained which, upon recrystallization from glacial acetic acid, had a melting point of about 82° C.

Example VIII 22.4 gm. of the 2-ethoxyethyl ether of salicylic acid methyl ester described in Example III were admixed with 6.1 gm. aminoethanol and the mixture was heated to 160° C. within a period of 5 hours in a distillation apparatus on an oil bath. The residue was then heated for an additional hour to 190° C. at a pressure of 1 mm. mercury on an oil bath, whereby a crystalline product was formed. After recrystallization of this product from methylethylketone, 16 gm. of the 2-ethoxyethyl ether of salicylic acid oxyethyl amide were obtained which had a melting point of 60° C.

Example IX 21.6 gm. of 5-bromo-salicylamide, 2.3 gm. sodium dissolved in 250 cc. absolute alcohol and 16.7 gm. of 2-propyloxyethyl bromide were heated for 15 hours with reflux. Thereafter the alcohol was driven off and the residue was admixed with a sodium carbonate solution. The resulting reaction product suspended in the sodium carbonate solution was then extracted with ether. After washing, drying and evaporating the ether solution, 23 gm. of the 2-propyloxyethyl ether of 5-bromosalicylamide were obtained which, after recrystallization from an acetone-petroleum ether mixture, had a melting point of 85° C.

Example X 21 gm. of the 2-ethoxyethyl ether of salicylic acid described in Example VI were heated with 15 gm. diethyl amine at 110° C. for 10 hours. The reaction product formed thereby was then freed from excess diethyl amine by distilling it in a vacuum. After refining the residue in the usual manner, 24 gm. of the 2-ethoxyethyl ether of salicylic acid diethyl amide described in Example VI were obtained.

Example XI 36 gm. of o-oxybenzonitrile, 46 gm. 2-ethoxyethyl bromide, 17 gm. potassium hydroxide and 2 gm. potassium iodide were dissolved in acetone and the solution was heated at the boiling point for 6 hours. After cooling the reaction mixture, the precipitated potassium bromide was filtered off and the filtrate was freed from acetone by distillation in a vacuum. The residue was dissolved in ether and then vigorously shaken with a 2 N-solution of sodium hydroxide. The ether solution was then freed from the solvent by distillation in a vacuum. The 2-ethoxyethyl ether of o-oxybenzonitrile obtained in this manner was dissolved without further purification in 250 cc. of an 80% aqueous solution of sulfuric acid, and the solution was permitted to stand for about 12 hours at room temperature. The resulting reaction mixture was then poured over ice and subsequently neutralized with sodium carbonate. The neutralized solution was then shaken with ether and, after evaporating the dry ether, 32 gm. of the 2-ethoxyethyl ether of salicylamide described in Example III were obtained.

Example XII

The product described in Example I was obtained with an 80% yield by heating a solution of equimolar amounts of salicylamide, potassium hydroxide and 2-butoxyethyl bromide with 2 gm. potassium iodide in the presence of acetone as a solvent for 6 hours at the boiling point of the solution.

Example XIII 80 cc. of a 25% aqueous sodium hydroxide solution were slowly added to a mixture of 95 gm. p-toluenesulfochloride and 52 gm. ethyleneglycol monopropyl ether while cooling and stirring the solution. The reaction mixture was then further stirred until completely neutralized. The p-toluenesulfonyl ester of ethyleneglycol monopropyl ether formed thereby was then admixed with 69 gm. salicylamide and 80 cc. of a 25% aqueous sodium hydroxide solution at room temperature. The resulting solution was then heated for 2 hours on a boiling water bath. After cooling, the reaction product was extracted from this reaction mixture with the aid of chloroform. The chloroform solution was washed until neutral, dried and evaporated in a vacuum. The crystalline residue was washed with a mixture of ether and petroleum ether in a ratio of 1:1, and then recrystallized from dilute alcohol. The crystalline product was the 2-propyloxyethyl ether of salicylamide described in Example II and had a melting point of 62° C.

Example XIV (a) 1.15 gm. sodium were dissolved in 40 cc. absolute alcohol. 6.85 gm. salicylamide were first added to this solution and then 6.1 gm. chloroethyl-methyl-thio-ether were stirred into the solution over a period of 10 minutes. The reaction mixture was then heated to boiling for 2 hours with reflux and subsequently poured into 200 cc. water. Upon cooling and stirring, a precipitate was formed which was filtered off and recrystallized from water. 7.5 gm. of o-(2-methyl-thioethoxy)-benzamide were obtained which had a melting point of 113° C.

(b) 2.3 gm. sodium were dissolved in 100 cc. absolute alcohol. 15.2 gm. salicylic acid methyl ether were first added to this solution and then 12.2 gm. chloroethyl-methyl-thio-ether were stirred into the mixture over a period of 15 minutes. The reaction mixture was then heated to boiling for 3 hours, cooled and freed from precipitated sodium chloride by suction filtration. The filtrate was poured into 500 cc. water whereby an oily substance separated out. The oily product was dissolved in ether, washed with 2 N sodium hydroxide and water, dried over sodium sulfate, and finally freed from solvent by distillation in a vacuum. The yield of o-(2-methyl-thioethoxy)-benzoic acid-methyl ester obtained in this manner was 17.4 gm. 11.3 gm. of this raw product were heated with 50 cc. concentrated ammonia for 2 hours at 100° C. in a glass tube. After cooling the contents of the tube and pouring them into water, o-(2-methyl-thioethoxy)-benzamide were obtained which, upon recrystallization from water, had a melting point of 113° C.

Example XV

By reacting a mixture of salicylamide, sodium and chloromethylethyl-thioether as described in Example XIV, o-(ethyl-thioethoxy)-benzamide was obtained which, upon recrystallization from water, had a melting point of 102° C.

Example XVI 18.4 gm. thioglycolic acid were slowly added to a solution of 16 gm. sodium hydroxide in 30 cc. water at substantially 0° C. 40 gm. o-(2-chloro-ethoxy)-benzamide dissolved in 300 cc. absolute alcohol were added to this cold solution. The resulting mixture was then heated for 2 hours with reflux while vigorously agitating the same with a rotary agitator. After cooling, the reaction mixture was filtered to remove precipitated sodium chloride and the filtrate was poured into 700 cc. water. The aqueous solution was then cooled to about 0° C. and its pH was adjusted to 1 with concentrated hydrochloric acid. A precipitate was formed which was removed by suction filtration, washed with water until neutral, dissolved in a sodium bicarbonate solution, filtered and the pH of the filtrate was again adjusted to 1 with concentrated hydrochloric acid. The precipitate formed thereby was washed with water until neutral and recrystallized from methanol. 22 gm. of o-(2-carboxymethyl-thioethoxy)-benzamide having a melting point of 127° C. were obtained.

*Example XVII*

By substituting 5-bromo-2-(2'-chloro)-ethoxy-benzamide for the o-(2-chloro-ethoxy)-benzamide in Example XVI and proceeding in an otherwise identical manner, the 2-carboxymethyl-thioethyl ether of 5-bromosalicylamide was obtained which had a melting point of 143° C.

*Example XVIII*

A mixture of 24.2 gm. of β-chloroethyl-p-toluene sulfonate, 18 gm. salicylic acid mono-methyl amide and 4.8 gm. sodium hydroxide dissolved in 25 cc. water was heated for 6 hours on a boiling water bath accompanied by vigorous stirring. Upon cooling the resulting clear solution, yellow crystals precipitated out. These crystals were filtered off by suction filtration, admixed with chloroform, washed with sodium hydroxide and water and dried over sodium sulfate. Thereafter the solvent was driven off by distillation in a vacuum. The residue was recrystallized from 60% ethanol whereby 18 gm. of the β-chloroethyl ether of salicylic acid mono-methyl amide were obtained in the form of a light yellow powder having a melting point of 92–93° C. 10.7 gm. of this product were dissolved in 60 cc. of warm alcohol and the solution was added to a mixture of 4.6 gm. thioglycolic acid, 4 gm. sodium hydroxide and 12 cc. water. The resulting solution was then heated for 2½ hours with reflux. After cooling the resulting reaction mass, the precipitated sodium chloride was filtered off and the filtrate was diluted to 500 cc. with water. After again filtering the aqueous solution by suction filtration, the filtrate was acidified with 2 N hydrochloric acid and again filtered by suction filtration. The precipitate separated thereby was washed with water until neutral. The raw product was dissolved in a solution of sodium bicarbonate, the solution was filtered and the product was reprecipitated from the filtrate with 2 N hydrochloric acid. After recrystallizing the precipitate from ethanol, 7 gm. of o-(2-carboxy-methyl-thioethoxy)-benzoic acid-N-methyl amide were obtained which had a melting point of 136° C.

We claim:
1. The 2-propyloxyethyl ether of salicylamide.
2. The 2-ethoxyethyl ether of salicylamide.
3. The 2-[(2'-butoxy)-ethoxy]-ethyl ether of salicylamide.
4. The 2-ethoxyethyl ether of salcylic acid diethyl amide.
5. Ortho-lower alkoxyethoxy-benzamide.
6. The 2-propyloxyethyl ether of thiosalicylamide.

References Cited in the file of this patent
UNITED STATES PATENTS 2,822,391   Suter et al. _____ Feb. 4, 1958

FOREIGN PATENTS 754,789   Great Britain _____ Aug. 15, 1956

OTHER REFERENCES

Jour. Org. Chem. (Weizmann et al.), vol. 13, pp. 796–98 (1948).

Therapie (Carron et al.), vol. 7, #1, pp. 27 and 28 (1952).

UNITED STATES PATENT OFFICE

CERTIFICATE OF CORRECTION

Patent No. 2,895,992  July 21, 1959

Gerhard Ohnacker et al

It is hereby certified that error appears in the printed specification of the above numbered patent requiring correction and that the said Letters Patent should read as corrected below.

Column 1, line 59, Formula III should read as shown below instead of as in the patent:

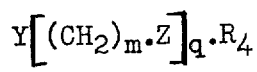

same column 1, line 70, for "nitrole" read -- nitrile --.

Signed and sealed this 22nd day of December 1959.

(SEAL)

Attest:
KARL H. AXLINE
Attesting Officer

ROBERT C. WATSON
Commissioner of Patents